United States Patent [19]

Upton

[11] Patent Number: 5,174,197
[45] Date of Patent: Dec. 29, 1992

[54] PORTABLE BARBECUE DEVICE

[76] Inventor: Anthony R. Upton, P.O. Box 110, Hillston, New South Wales 2675, Australia

[21] Appl. No.: 776,976

[22] Filed: Oct. 15, 1991

Related U.S. Application Data

[63] Continuation-in-part of Ser. No. 490,358, Mar. 8, 1990, abandoned.

[51] Int. Cl.[5] .............................................. A47J 37/07
[52] U.S. Cl. ........................................ 99/449; 99/450; 126/9 R; 126/25 R
[58] Field of Search ................. 99/449, 482, 394, 450; 126/9 B, 9 R, 25 R, 99 R; 248/166, 439; 108/127

[56] References Cited

U.S. PATENT DOCUMENTS

| | | | |
|---|---|---|---|
| 306,063 | 10/1884 | Crosse | 99/394 |
| 1,155,838 | 10/1915 | Rose | 99/394 |
| 1,566,504 | 12/1925 | Pearsall | 248/166 |
| 2,148,439 | 2/1939 | Crawford | 99/450 |
| 2,413,204 | 12/1946 | Wolff | 99/425 |
| 2,559,243 | 7/1951 | Brown | 126/9 R |
| 2,619,672 | 12/1952 | Glaser | 16/116 R |
| 3,075,798 | 1/1963 | Smith | 99/449 |
| 3,416,510 | 12/1968 | Paulson | 126/25 R |
| 3,905,286 | 9/1975 | Le Grady | 126/25 R |
| 4,334,516 | 6/1982 | Dittmer | 126/9 R |
| 4,770,380 | 9/1988 | Eason | 248/439 |

FOREIGN PATENT DOCUMENTS 874946 8/1961 United Kingdom ............... 108/127

*Primary Examiner*—Harvey C. Hornsby
*Assistant Examiner*—Randall Edward Chin
*Attorney, Agent, or Firm*—Edwin D. Schindler

[57] ABSTRACT

A barbecue device is disclosed, which includes a cooking support member in the form of a slightly concave plate or grid. A support is pivotally connected to the rim of the cooking support member with the support being rotatable from a stowed position, at which the support overlies the upper surface of the cooking support member, to an operating position, at which the support extends downwardly from the cooking support member. A handle is pivotally connected to the rim of the cooking support member with the handle being able to be rotated from a stowed position, at which the handle overlies the upper surface of the cooking support member to retain the support thereon, to an operating position at which the handle extends outwardly from the cooking support member. The handle includes an extension adapted to extend beneath the cooking support member in the operating position, which also acts as a stop against further pivotal movement of the handle. The dimensions of the handle and the support are such that when the support and the handle are in their respective stowed positions, the handle overlies the support and prevents rotation thereof.

18 Claims, 3 Drawing Sheets

PORTABLE BARBECUE DEVICE

This application is a continuation-in-part of application Ser. No. 07/490,358, filed Mar. 8, 1990, now abandoned.

FIELD OF THE INVENTION

This invention relates to a portable barbeque device and more particularly to one foldable to minimum dimensions.

SUMMARY OF THE INVENTION

This invention in one aspect resides broadly in a barbecue device, comprising:

a cooking support member being in the form of a slightly concave plate or grid, said cooking support member having a rim, an upper surface and an underside;

support means pivotally connected to the rim of said cooking support member, said support means being rotatable from a stowed position at which said support means overlies the upper surface of said cooking support member, to an operating position at which said support means extends downwardly from said cooking support member; and handle means pivotally connected to said cooking support member, said handle means being rotatable from a stowed position at which said handle means overlies the upper surface of said cooking support member to retain said support means thereon, to an operating position at which said handle means extends outwardly from said cooking support member, said handle means including an extension adapted to extend beneath said cooking support member in said operating position and acting as a stop against further pivotal movement of said handle means;

wherein the dimensions of said handle means and said support means are such that when said support means and said handle means are in their respective stowed positions, said handle means overlies said support means and prevents rotation thereof.

BRIEF DESCRIPTION OF THE SEVERAL VIEWS OF THE DRAWINGS

In order that this invention may be more easily understood and put into practical effect, reference will now be made to the accompanying drawings which illustrates a preferred embodiment of the invention, wherein.

DETAILED DESCRIPTION

Figure 4:
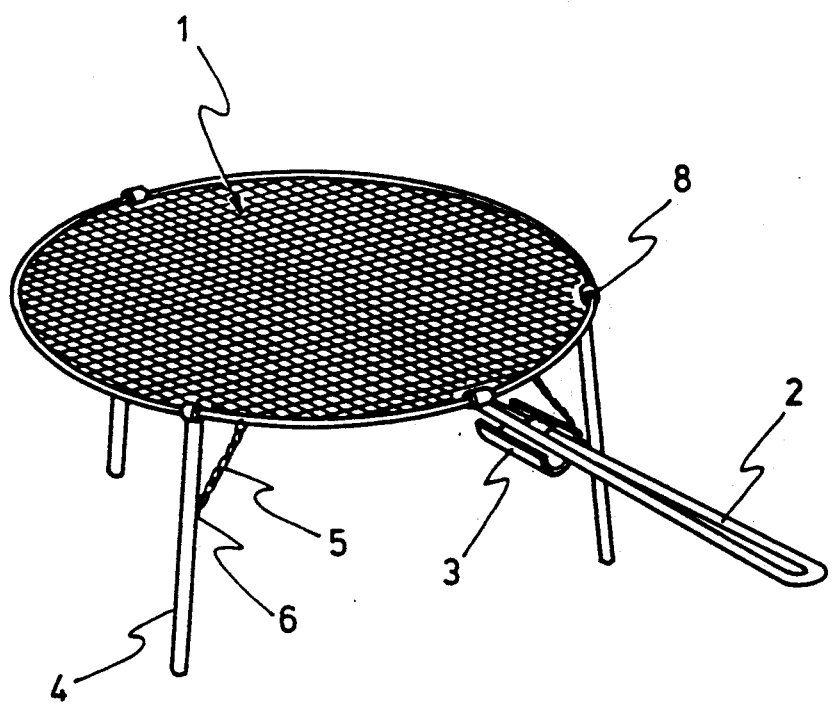
FIG. 4 illustrates the device of FIG. 1 having a cooking grid or food support member.
Figure 8:
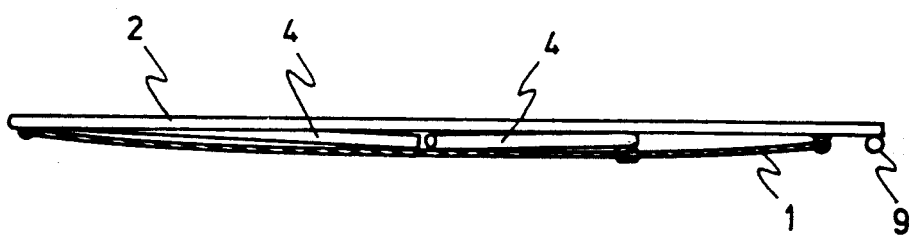
FIG. 8 is a cross section through CC in FIG. 7 and illustrates the portable barbecue in folded mode.

Referring to the drawings, a cooking member or food support 1 is shown in the form of a circular plate, slightly dished or concave as seen in FIG. 8, with a grease or fat draining aperture 7. Cooking member 1 could of course be ellipsoidal or rectangular. The cooking member 1 could also be of grid form as illustrated in FIG. 4 or a combined grid/plate form (not shown) for convenience of cooking various types of foods.

A number of cut-out portions 10 provide space for attachment of a handle member 2 and leg members 4. The cut-out portions are bridged by a peripheral pintle 11 about which the handle member 2 and leg members 4 pivot.

Figure 1:
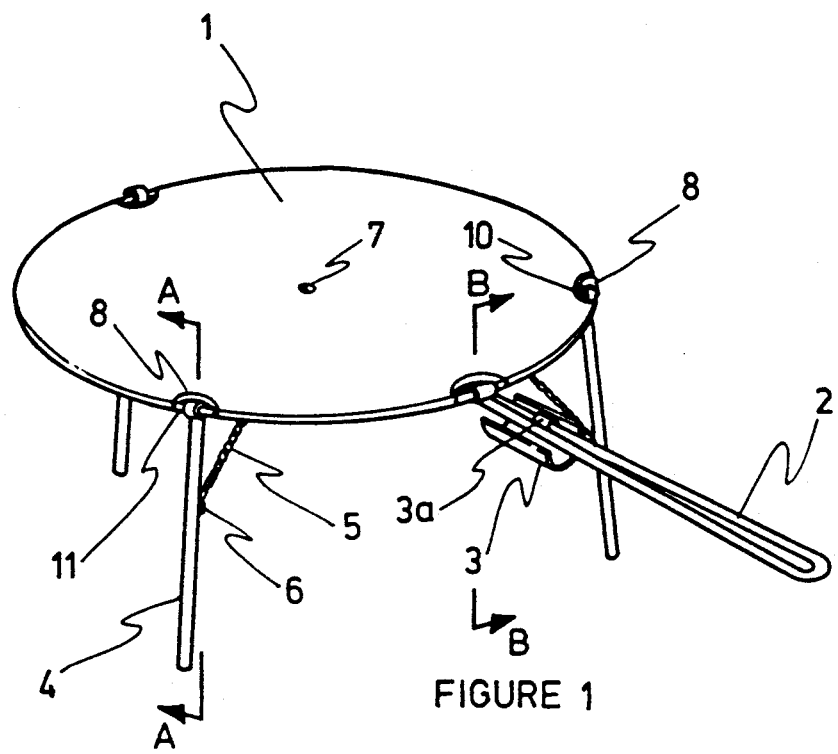
FIG. 1 illustrates the device in assembled ready to use mode with a cooking plate or food support member.
Figure 2:
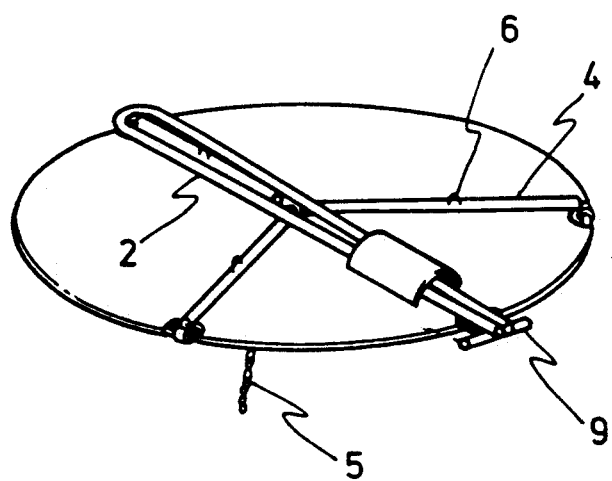
FIG. 2 shows the device in collapsed or folded mode ready for carrying or transport.
Figure 3:
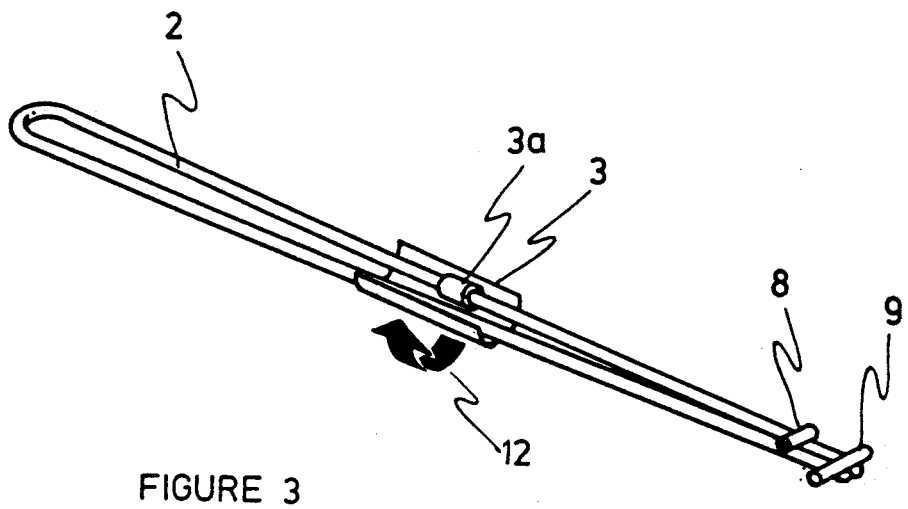
FIG. 3 depicts a preferred form of the handle member.
Figure 6:
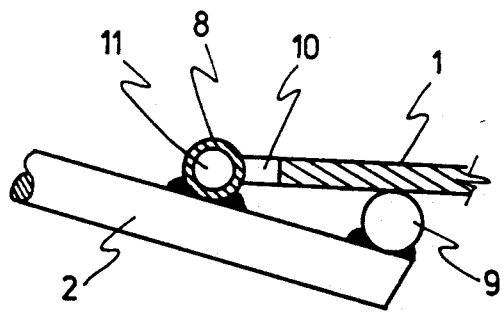
FIG. 6 is a cross section through BB in FIG. 4 and illustrates the abutment of the handle on the cooking member.

Handle member 2 and leg members 4 are pivotally attached by hinged members 8 to cooking member 1. Handle member 2 is preferably simply made from a piece of rod bent as shown. The distal end thereof has a cross member 9 affixed thereto as seen in FIGS. 2 and 3. In assembled form as shown FIGS. 1 and 6 cross member 9 constitutes a stop means against the underside of cooking member 1 thereby limiting the travel downwardly of handle 2. In folded mode as seen in FIG. 2 the cross member 9 constitutes a carrying handle for the device.

As seen in FIG. 8, the longitudinal axis of cross member 9 is offset from the longitudinal axis of the handle member 2 such that when the barbeque device is being carried vertically by the cross member 9 in a folded configuration, the handle means 2 and the cooking member 1 are biased towards each other by the moment of forces due to the offsetting of cross member 9, such that the legs 4 are retained between the handle means 2 and the cooking member 1 in a manner subsequently to be described.

Figure 5:
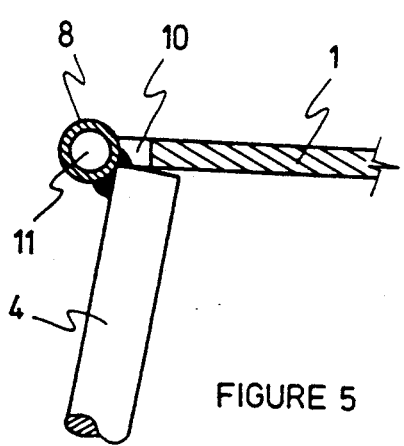
FIG. 5 is a cross section through AA in FIG. 4 and illustrates the abutment of the legs on the cooking member.

As can be seen in FIG. 5, the legs 4 are attached to a respective hinged member 8 in an offset position whereby the end of the leg 4 adjacent the hinge means 8 abuts the edge of the cooking plate 1 at the inner edge of the cut-out portion 10 thereby supporting the leg 4 and preventing it collapsing inwardly.

A slidable hand grip means 3 is positioned on handle means 2. The hand grip 3 is slidably mounted on one arm of the handle 2 by attachment means 3(a) which is in the form of a short length of tubing. As particularly shown in FIG. 3, the member 3 is tiltable in the direction of arrows 12 about the longitudinal axis of handle means 2 thereby allowing a buffer zone of insulating air between members 2 and 2 and so having minimal contact - three small points between the members, i.e., (a) between one arm of the handle 2 and the attachment means 3(a);
(b) between one arm of the handle 2 and the handgrip 3; and,
(c) between the other arm of the handle 2 and the handgrip 3.

The effect of this preferred modification is to minimize heat transfer between the handle and grip is use. The attachment means 3(a) is slidably mounted on the handle means 2 and is frictionally engageable by the two arms of the handle means 2 where they converge towards their pivot support with the cooking member 1.

A plurality of chains 5 affixed to the underside of cooking member 1 are attached by hook means or like attachment means to corresponding and cooperating attachment means 6 on legs 4. The function of the chains is to prevent collapse of the legs. Chain 5 could of course be replaced by wire cable or the like. Alternatively a washer or the like may at attached to the chain or wire and adapted to be restrained by the legs 2 or by attachments thereto.

Figure 7:
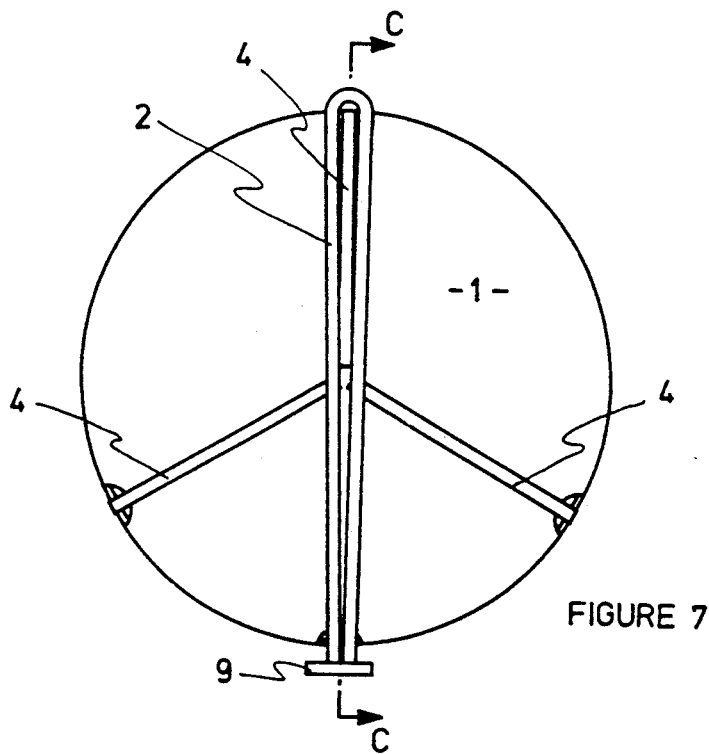
FIG. 7 is a plan view of the portable barbeque in folded mode.

The handle member 2 and the legs 4 are foldable onto the upper surface of the cooking member 1 as shown in FIGS. 2, 7 and 8. The legs 4 are of such length that the handle 2 serves to retain them against the surface of the cooking member 1. In other words, the legs 4 are of sufficient length so that they are retainable in the folded mode against the upperside of the cooking support member 1 by being overlaid by the handle means 2. The handle means 2 is of sufficient length to extend beyond the outer periphery of the cooking support member 1 opposite the point of pivot connection such that, as seen in FIGS. 2 and 7, the leg 4 opposite the pivot point of the handle means 2 is received within the hollow formed between the two arms of the handle means 2 at the divergent end and restrained against rotation by the two arms as they converge.

As can be seen in FIG. 7 the curvature of the cooking member 1 is such that the legs 4, when positioned thereon in folded mode, fit snugly beneath the handle means 2 extending across the cooking member 1. This is achieved by having the depth at the centre of the cooking member substantially equal to the cross sectional dimension of the legs 4.

The material of construction may be any suitable material such as mild steel or aluminum alloy.

In use the curvature of cooking member 1, the relative positioning of the legs 4 and the handle 2, and the offset location of the handle cross piece 9 combine to cause the portable barbeque to configure to a folded mode having minimal dimensions. When held vertically by the cross member 9 in the stowed position the handle pivots about pintle 11 to retain the legs against the upper surface of the plate whereby the barbeque is stably supported without the need for holding straps or the like.

It will of course be realized that whilst the above has been given by way of an illustrative example of this invention, all such and other modifications and variations hereto, as would be apparent to persons skilled in the art, are deemed to fall within the broad scope and ambit of this invention as is herein set forth.

I claim:

1. A barbecue device, comprising:
  a cooking support member being in the form of a slightly concave plate, said cooking support member having a rim, an upper surface and an underside;
  support means pivotally connected to the rim of said cooking support member, said support means being rotatable from a stowed position at which said support means overlies the upper surface of said cooking support member, to an operating position at which said support means extends downwardly from said cooking support member; and
  handle means pivotally connected to the rim of said cooking support member, said handle means being rotatable from a stowed position at which said handle means overlies the upper surface of said cooking support member to retain said support means thereon, to an operating position at which said handle means extends outwardly from said cooking support member, said handle means including an extension adapted to extend beneath said cooking support member in said operating position and acting as a stop against further pivotal movement of said handle means;
  wherein the dimensions of said handle means and said support means are such that when the said support means and said handle means are in their respective stowed positions, said handle means overlies said support means and prevents rotation thereof.

2. A barbecue device as claimed in claim 1, wherein said extension of said handle means includes a cross member having a longitudinal axis offset from the longitudinal axis of the handle means whereby said handle means pivots towards said cooking support member when the device is held by said cross member in a vertical stowed position.

3. A barbecue device as claimed in claim 1 wherein said support means include a plurality of legs rotatable abut and retainable against said cooking support member, said legs each being releasably engagable by engagement means affixed to the underside of said support member so that in use said legs do not collapse.

4. A barbecue device as claimed in claim 3 wherein said legs are dimensioned to be received within the concavity in said cooking support member and to be retainable against the upper surface thereof by said handle means.

5. A barbecue device as claimed in claim 1 wherein said cooking support member is in the form of a circular plate.

6. A barbecue device as claimed in claim 1 wherein said cooking support member is provided with a grease draining aperture.

7. A barbecue device as claimed in claim 1 wherein the handle means are formed from a piece of bent rod.

8. A barbecue device as claimed in claim 1 further comprising slidable handle grip means on the handle means.

9. A barbecue device as claimed in claim 8 wherein the handle grip means is pivotal with respect to the handle means.

10. A barbecue device, comprising:
  a cooking support member being in the form of a slightly concave grid, said cooking support member having a rim, an upper surface and an underside;
  support means pivotally connected to the rim of said cooking support member, said support means being rotatable from a stowed position at which said support means overlies the upper surface of said cooking support member, to an operating position at which said support means extends downwardly from said cooking support member; and
  handle means pivotally connected to the rim of said cooking support member, said handle means being rotatable from a stowed position at which said handle means overlies the upper surface of said cooking support member to retain said support means thereon, to an operating position at which said handle means extends outwardly from said cooking support member, said handle means including an extension adapted to extend beneath said cooking support member in said operating position and acting as a stop against further pivotal movement of said handle means;
  wherein the dimensions of said handle means and said support means are such that when said support means and said handle means are in their respective stowed positions, said handle means overlies said support means and prevents rotation thereof.

11. A barbecue device as claimed in claim 10, wherein said extension of said handle means includes a cross member having a longitudinal axis offset from the longitudinal axis of the handle means whereby said handle means pivots toward said cooking support member when the device is held by said cross member in a vertical stowed position.

12. A barbecue device as claimed in claim 10 wherein said support means includes a plurality of legs rotatable about and retainable against said cooking support member, said legs each being releasably engagable by engagement means affixed to the underside of said support member so that in use said legs do not collapse.

13. A barbecue device as claimed in claim 12 wherein said legs are dimensioned to be received within the concavity in said cooking support member and to be retainable against the upper surface thereof by said handle means.

14. A barbecue device as claimed in claim 10 wherein said cooking support member is in the form of a circular plate.

15. A barbecue device as claimed in claim 10 wherein said cooking support member is provided with a grease draining aperture.

16. A barbecue device as claimed in claim 10 wherein said handle means are formed from a piece of bent rod.

17. A barbecue device as claimed in claim 10 further comprising slidable handle grip means on said handle means.

18. A barbecue device as claimed in claim 17 wherein said handle grip means is pivotal with respect to said handle means.

* * * * *